United States Patent
Liao

[11] Patent Number: 6,148,879
[45] Date of Patent: Nov. 21, 2000

[54] WOOD PLANING MACHINE

[76] Inventor: Juei-Seng Liao, No.295, Sec. 1, Nanking E. Rd., Tun Dist., Taichung City, Taiwan

[21] Appl. No.: 09/368,795

[22] Filed: Aug. 5, 1999

[51] Int. Cl.[7] .............................. B27C 1/00; B27G 19/00
[52] U.S. Cl. ................................ 144/117.1; 144/252.1; 409/137
[58] Field of Search .......................... 30/415, 475; 83/58, 83/61, 100; 144/114.1, 116, 117.1, 129, 130, 252.1; 409/137; 451/352, 451, 453

[56] References Cited

U.S. PATENT DOCUMENTS

| | | | |
|---|---|---|---|
| 2,595,483 | 5/1952 | Petter | 144/252.1 |
| 4,485,859 | 12/1984 | Krogstan et al. | 144/252.1 |
| 4,932,449 | 6/1990 | Omoto | 144/252.1 |
| 5,007,469 | 4/1991 | Englert et al. | 144/252.1 |
| 5,143,128 | 9/1992 | Chen | 144/252.1 |
| 5,176,478 | 1/1993 | Munch | 409/137 |
| 5,815,934 | 10/1998 | Eichberger et al. | 144/252.1 |

*Primary Examiner*—W. Donald Bray
*Attorney, Agent, or Firm*—Christie, Parker & Hale, LLP

[57] ABSTRACT

A wood planing machine includes a base, a carriage mounted on the base and having a top surface, a rotary cutter mounted on the carriage, a shaving discharge plate overlying the top surface of the carriage to confine a shaving passageway and having a plurality of openings, a driving unit connected to the rotary cutter and having a ventilation outlet, and a guide casing mounted on the shaving discharge plate to confine therewith an air duct. The air duct has a tapered inlet connected to and in communication with the ventilation outlet, and a plurality of channels which extend divergingly inside the air duct from the tapered inlet to the openings of the shaving discharge plate.

7 Claims, 8 Drawing Sheets

WOOD PLANING MACHINE

BACKGROUND OF THE INVENTION

1. Field of the Invention

This invention relates to a wood planing machine, more particularly to a wood planing machine with an air duct for guiding air to flow into a shaving passageway along different paths.

2. Description of the Related Art

FIGS. 1 to 3 illustrate a conventional wood planing machine 10. The wood planing machine 10 includes a base 11 with upstanding posts 12 disposed at the corners of the base 11 for supporting a carriage 13 thereon. A motor 14 is mounted on the carriage 13 for driving a rotary cutter 15 which is mounted on a receiving space 131 of the carriage 13. The motor 14 is provided with a ventilation outlet 141 above the rotary cutter 15. A shaving discharge member 20 is mounted on the top surface of the carriage 13, and has a discharge plate 22. The discharge plate 22 is fastened to a pair of opposite locking pieces 132 of the carriage 13 via screw means 16 that pass through through-holes 133 in the carriage 13 and through-holes 221 in the discharge plate 22. The discharge plate 22 overlies a top surface of the carriage 13 to confine therewith a shaving passageway 171, and has an opening 222 in communication with the shaving passageway 171. A guide casing 20 is disposed on the discharge plate 22, and has an air inlet 211 in communication with the ventilation outlet 141, an air outlet 212 opposite to the air inlet 211 and aligned above the opening 222 of the discharge plate 22, and an air channel 2:L3 extending thereinside from the air inlet 211 to the air outlet 212. The shaving passageway 171 has a shaving outlet 17 opposite to the rotary cutter 15.

When in operation, air flow from the ventilation outlet 141 enters into the air channel 213 via the air inlet 211, and then flows into the shaving passageway 171 via the air outlet 212 and the opening 222 of the discharge plate 22 so as to blow wood shavings toward the shaving outlet 17. Since the air flow is only guided by the channel 213 via the opening 222 of the discharge plate 22 in one direction before entering into the shaving passageway 171, it is normally insufficient to obtain uniform distribution of the air flow inside the shaving passageway 171, thereby hindering the discharge of the wood shavings. It has been found that an increase of the height in the shaving outlet 17 may improve the discharge of the wood shavings, however, such increase may arise in a safety problem as the hands of the operator can easily enter into the outlet 17 and can thus be injured during operation.

SUMMARY OF THE INVENTION

Therefore, it is an object of the present invention to provide a wood planing machine that is capable of overcoming the disadvantages described above.

Accordingly, a wood planing machine of this invention comprises: a base having a work table and a plurality of upstanding posts; a carriage mounted movably on the posts above the work table and having a top surface and a front end; a rotary cutter mounted on the carriage rearwardly of the front end; a shaving discharge plate mounted on the carriage and extending rearwardly from the front end to a location above the rotary cutter to overlie the top surface and confine a shaving passageway between the shaving discharge plate and the top surface, the shaving discharge plate having a plurality of openings communicated with the shaving passageway and arranged in a row along the length of the shaving discharge plate adjacent to the front end; driving means mounted on the carriage and connected to the rotary cutter, the driving means having a ventilation outlet adjacent to the shaving passageway; and a guide casing mounted on the shaving discharge plate above the openings to confine therewith an air duct between the shaving passageway and the ventilation outlet, the air duct having a tapered inlet communicated with the ventilation outlet, and a plurality of partitioned channels which extend divergingly inside the air duct from the tapered inlet to the openings of the shaving discharge plate and which are adapted to guide air from the ventilation outlet to flow past an entire space of the shaving passageway.

BRIEF DESCRIPTION OF THE DRAWINGS

In drawings which illustrate an embodiment of the invention.

DETAILED DESCRIPTION OF THE PREFERRED EMBODIMENT

Figure 1:
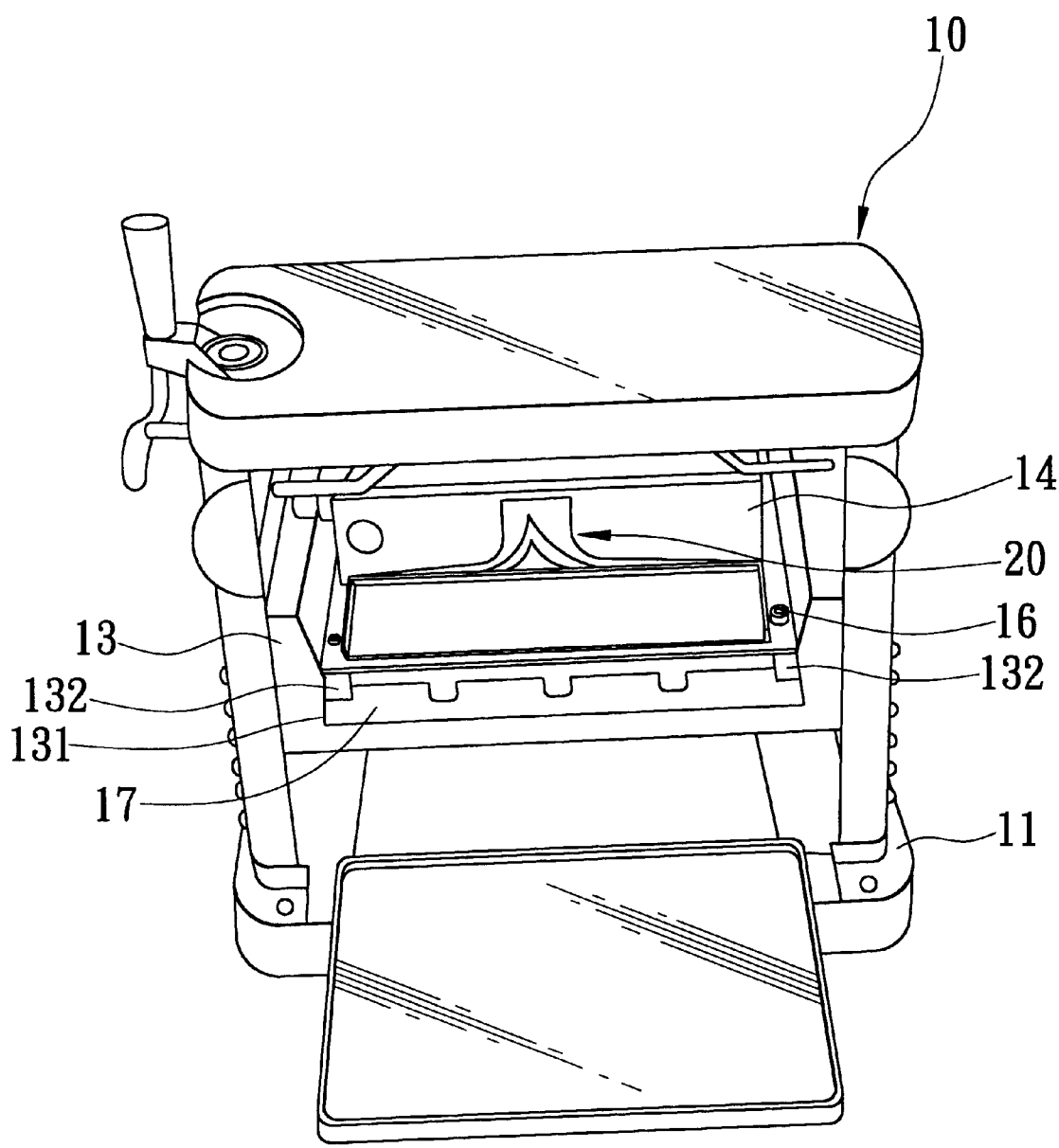
FIG. 1 is a perspective view of a conventional wood planing machine.
Figure 2:
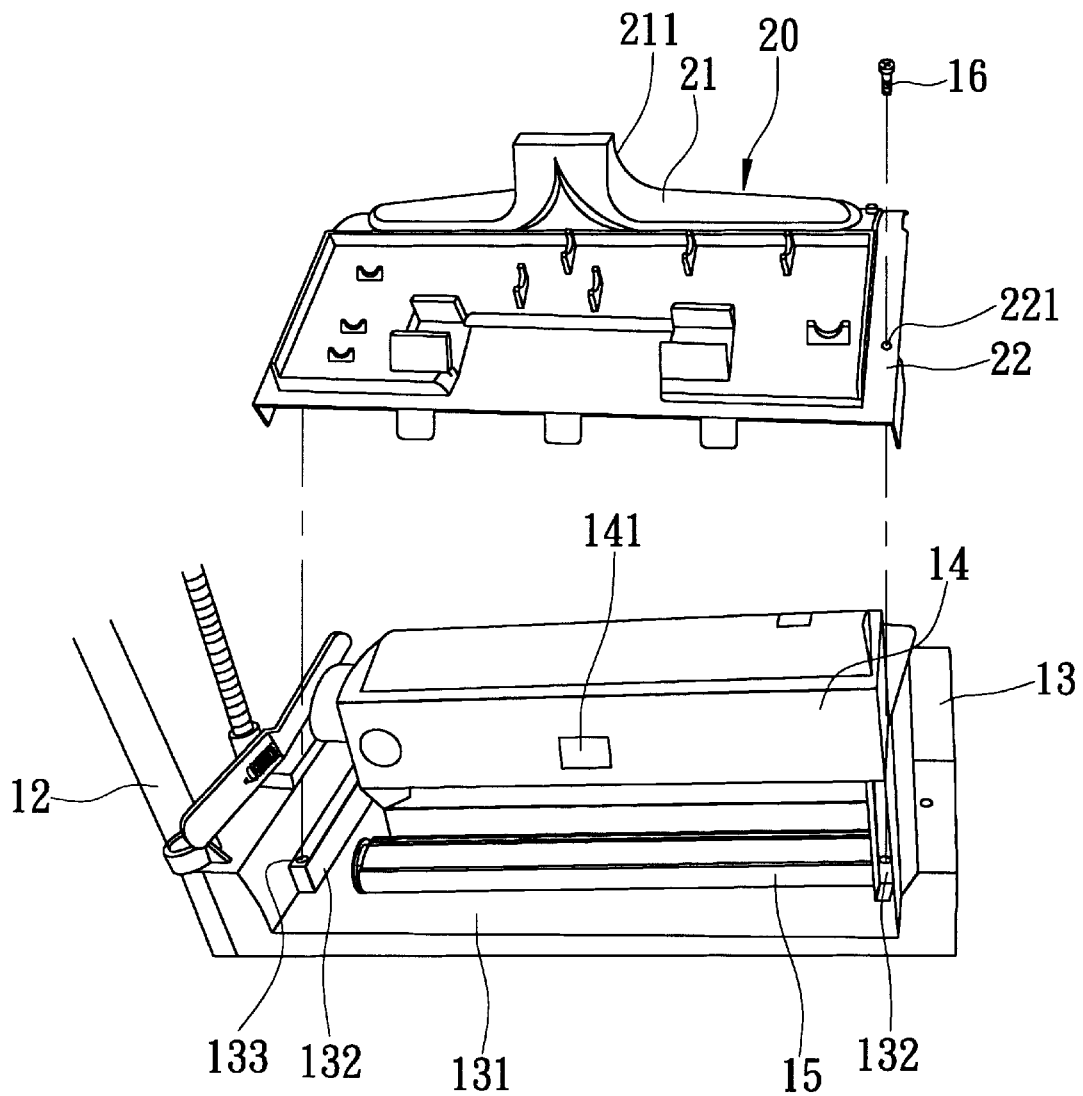
FIG. 2 is a fragmentary exploded perspective view of the wood planing machine of FIG. 1.
Figure 3:
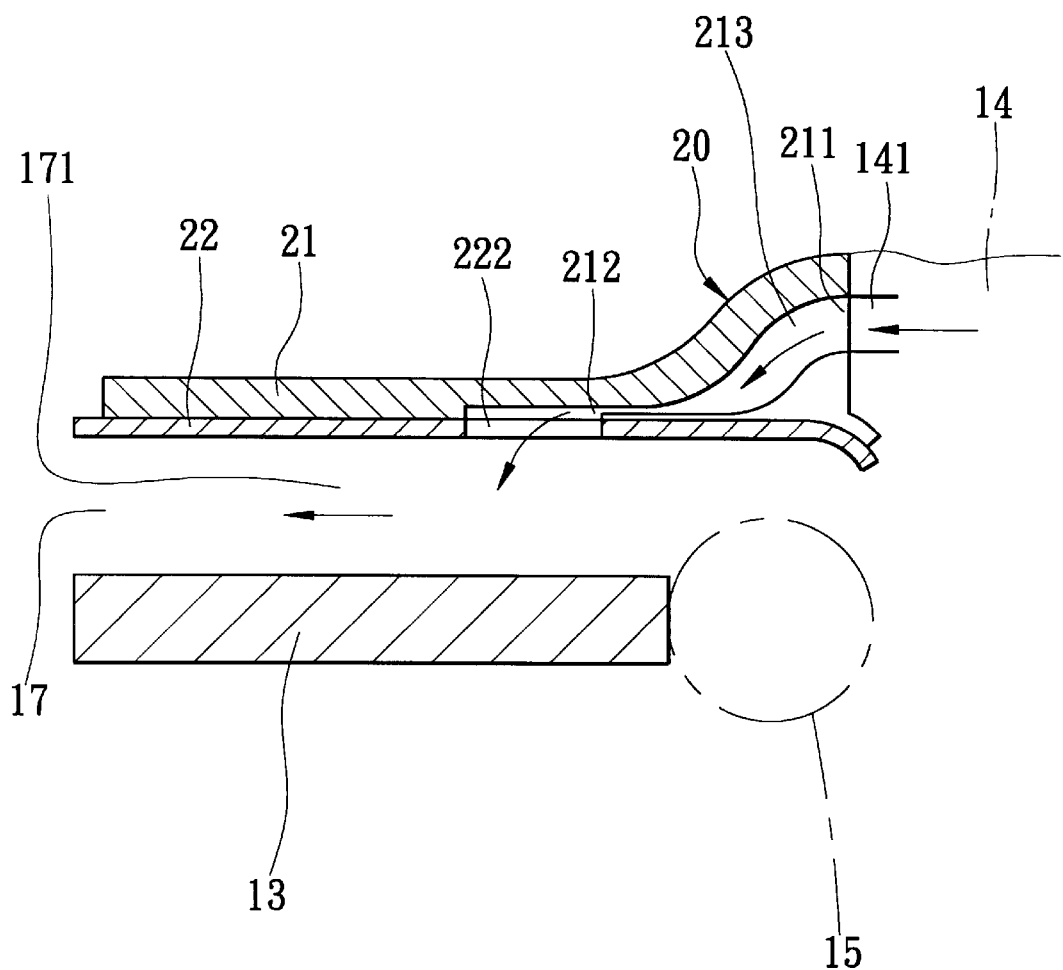
FIG. 3 is a fragmentary cross-sectional side view of the wood planing machine of FIG. 1.
Figure 4:
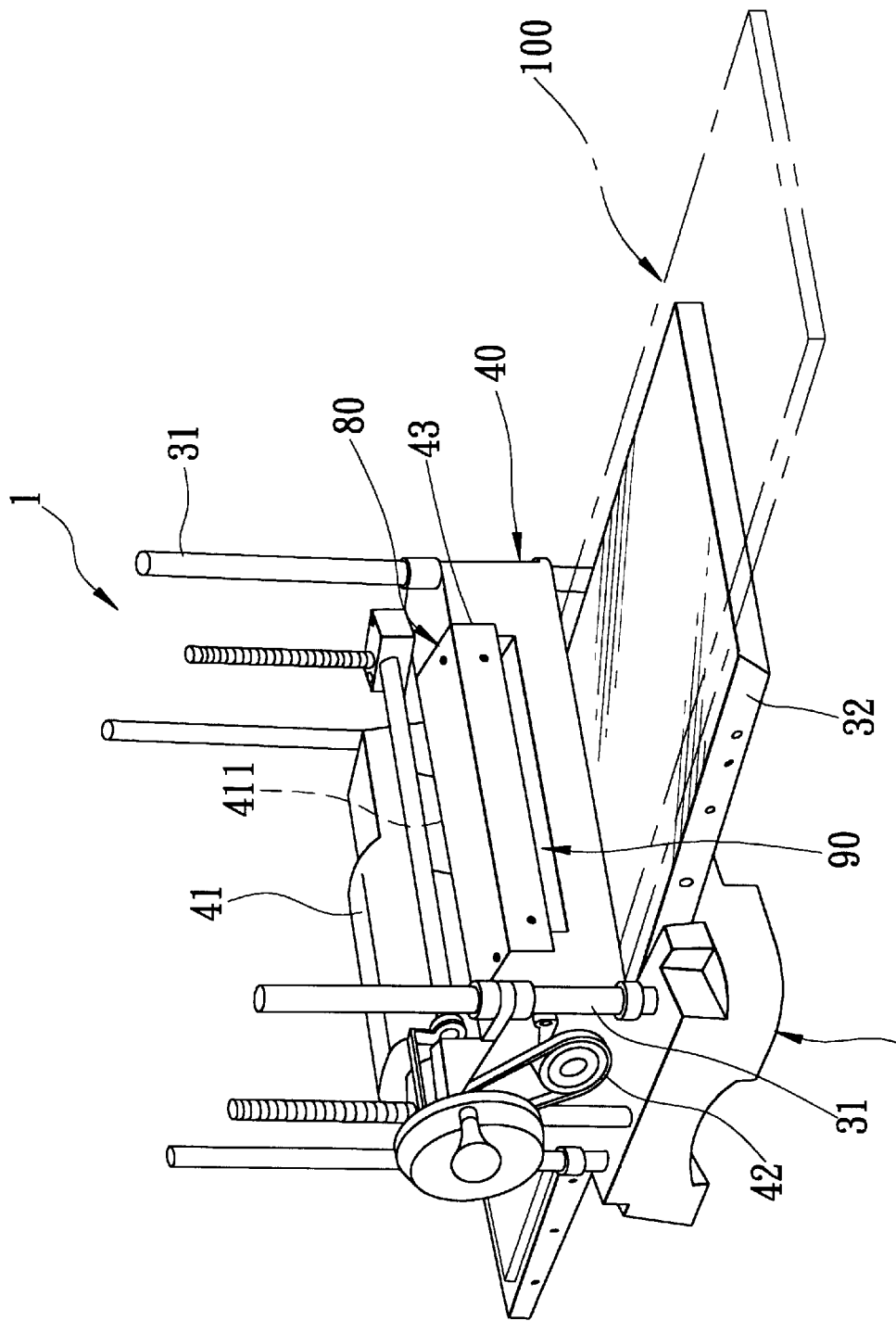
FIG. 4 is a perspective view of a wood planing machine embodying this invention.
Figure 5:
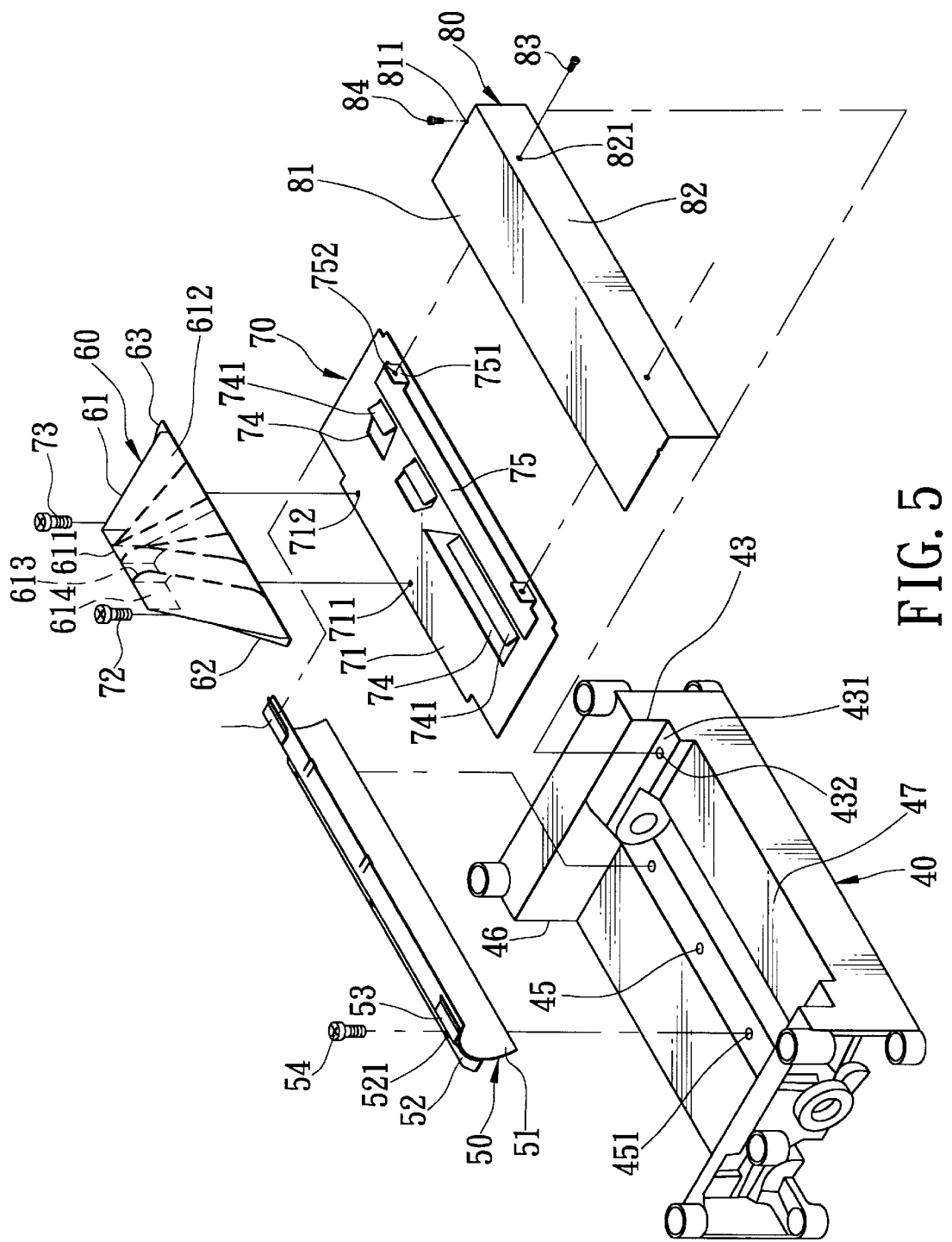
FIG. 5 is an exploded view of the wood planing machine of FIG. 4.

FIGS. 4 and 5 illustrate a wood planing machine 1 embodying this invention. The wood planing machine 1 includes a base 30 having a plurality of upright posts 31 thereon, a carriage 40 mounted movably on the posts 31, a curved guide plate 50 mounted on the carriage 40, a shaving discharge plate 70 disposed above the carriage 40, a guide casing 60 mounted on the shaving discharge plate 70, and a cover plate 80 mounted on the carriage 40 and connected to the shaving discharge plate 70.

The base has a work table 32 over which a wood work piece 100 passes.

The carriage 40 includes opposing front and rear ends 43, 46, a top surface 47 extending from the front end 43 to the rear end 46, a locking seat 45 disposed on the top surface 47, and a pair of opposing shoulders 431 disposed on the top surface 47 frontwardly of the locking seat 45. A motor 41 is mounted on the rear end 46 of the carriage 40. A rotary cutter 46 (not shown) is mounted on the carriage 40 adjacent to the locking seat 45. The rotary cutter 46 is driven by a transmission mechanism 42 which is mounted on one side of the carriage 40.

Figure 7:
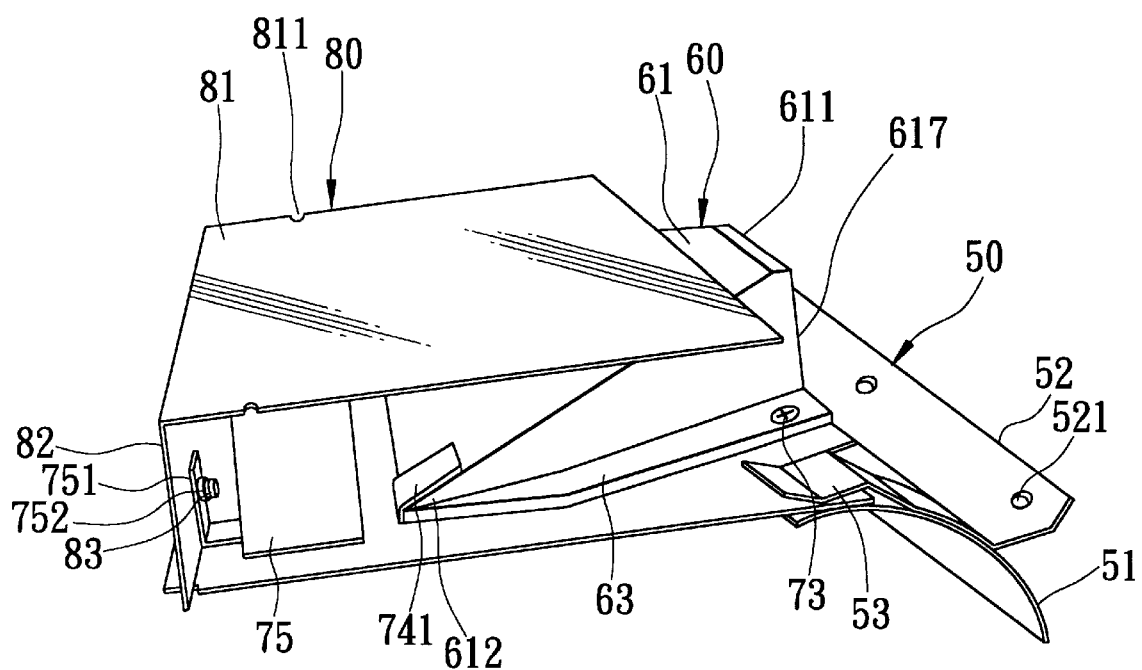
FIG. 7 is another fragmentary perspective view of the wood planing of FIG. 4.
Figure 8:
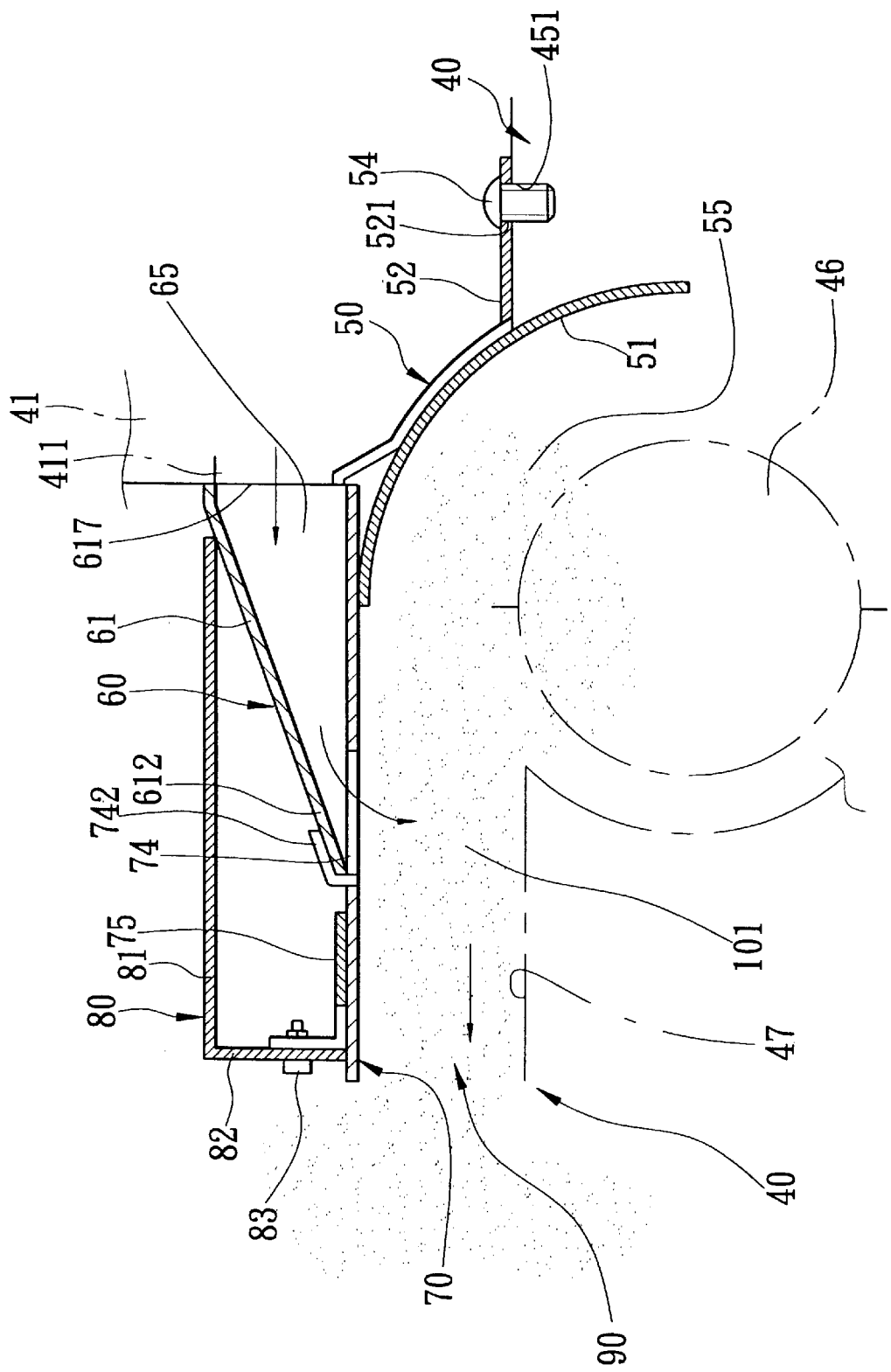
FIG. 8 is a fragmentary cross-sectional side view of the wood planing machine of FIG. 4.

Referring now to FIG. 8 in combination with FIGS. 4 and 5, the curved guide plate 50 extends downwardly and rearwardly from the bottom of the shaving discharge plate 70, and extends circumferentially above the rotary cutter 46 so as to confine with one side of the rotary cutter 46 a curved passage 55 between the curved guide plate 50 and the rotary cutter 46. The curved guide plate 50 includes a flange 52 fastened to the locking seat 45 of the carriage 40 via screw means 54 that pass through through-holes 521 on the flange 52 and through-holes 451 on the locking seat 45. A pair of clamping pieces 53 extend frontwardly from the curved guide plate 50 to clamp the shaving discharge plate 70 (see FIG. 7).

The shaving discharge plate 70 extends rearwardly from the front end 43 to a location above the rotary cutter 46 to overlie the top surface 47 of the carriage 40 and confine a shaving passageway 101 between the shaving discharge plate 70 and the top surface 47 (see FIG. 8). The shaving passageway 101 is in communication with the curved passage 55, and has a shaving outlet 90 opposite to the curved passage 55. A plurality of openings 74 are formed in the shaving discharge plate 70 to communicate with the shaving passageway 101, and a plurality of integral louver plates 741 are formed respectively at the openings 74 and are raised upwardly and inclindely from the shaving discharge plate 70. A locking plate 75 is connected to the shaving discharge plate 70, and has; a pair of opposite ear plates 75 projecting upward therefrom.

Figure 6:
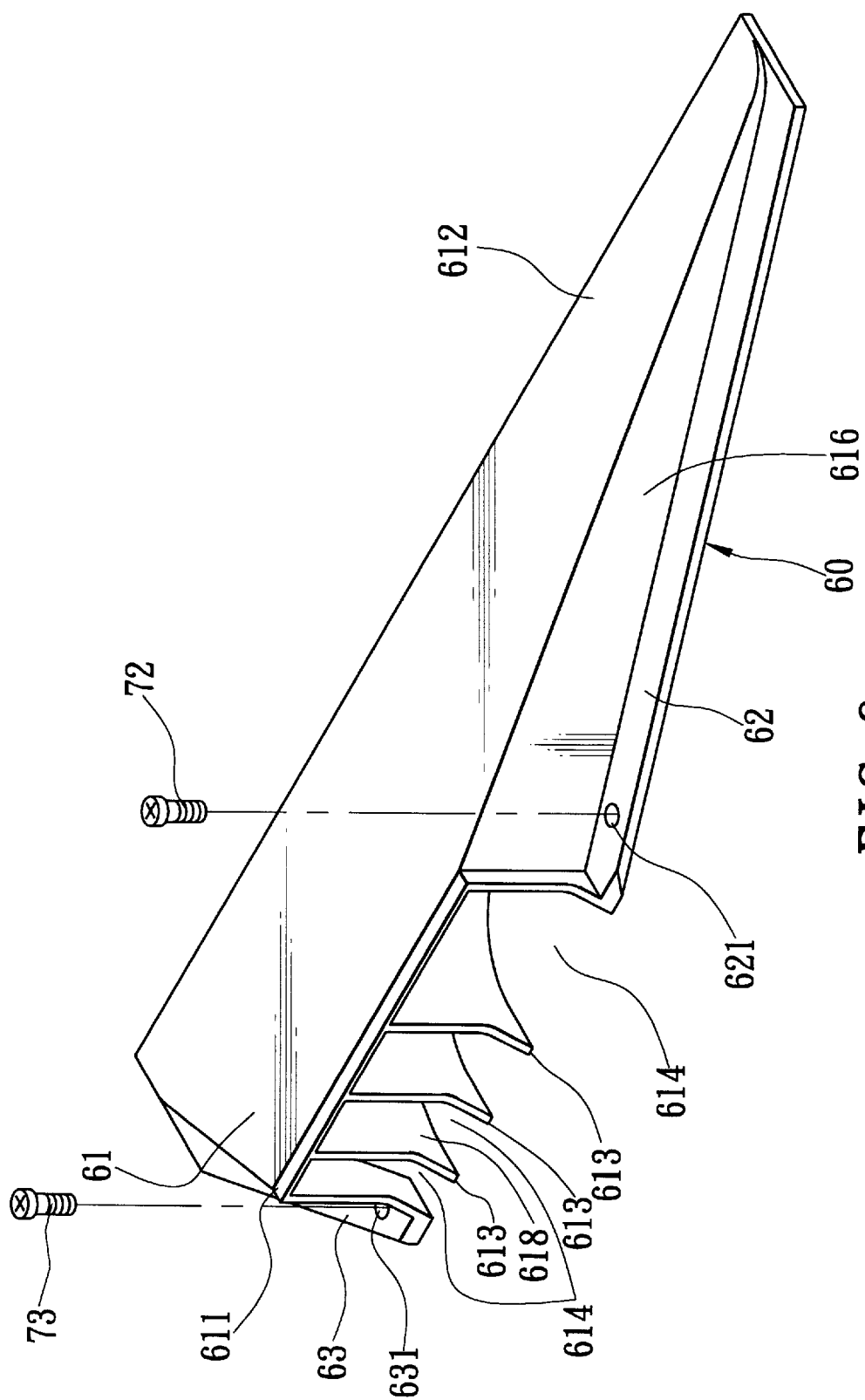
FIG. 6 is a perspective view of a guide casing of the wood planing machine of FIG. 4.

Referring now to FIG. 6 in combination with FIGS. 4, 5, and 8, the guide casing 60 has an inclined top wall 61 opposite to the shaving discharge plate 70, a pair of opposing inclined side walls 616 extending downward from the top wall 61 to the shaving discharge plate 70, a plurality of partitioning plates 613 extending downward from the top wall 61 to the shaving discharge plate 70, and a pair of opposing side flanges 62, 63 extending horizontally from the side walls 616, respectively. The top wall 61 has a tapered end 611 and an enlarged end 612 opposite to the tapered end 611, and inclines upwardly from the enlarged end 612 to the tapered end 611. The side walls 616 diverge from the enlarged end 612 to the tapered end 611. The partition plates 613 have confronting faces 618 which diverge away from one another. The guide casing 60 is fastened on the shaving discharge plate 70 via screw means 72, 73 that pass through through-holes 621, 631 on the side flanges 62, 63 and through-holes 711, 712 on the shaving discharge plate 70, with the enlarged end 612 clamped between the shaving discharge plate 70 and the louver plates 741 so as to confine therewith an air duct 65 (see FIG. 8).

The air duct 65 has a tapered inlet 617 adjacent to the tapered end 611. The tapered inlet 617 is connected to and in communication with the ventilation outlet 411. A plurality of channels 614 confined by the partitioning plates 613 are formed inside the air duct 65, and extend divergingly from the tapered inlet 617 to the openings 74 of the shaving discharge plate 70.

Referring now to FIG. 7 in combination with FIGS. 4 and 5, the cover plate 80 is of an L-shaped cross-section, and has a downward extension 82 covering the front end 43 of the carriage 40, and a top part 81 extending above the shaving discharge plate 70 and connected to the downward extension 82. The top part 81 is secured to the carriage 40 via screw means 84 that pass through through-holes 811 on the top part 81 and through-holes 432 on the shoulders 431 of the carriage 40. The shaving discharge plate 70 is fastened to the downward extension 82 via screw means 83 through through-holes 821 on the downward extension 82 and through-holes 752 on the ear plates 751.

When in operation, as illustrated in FIG. 8, wood shavings enter into the curved passage 55 as the work piece 100 passes over the rotary cutter 46, and are carried into the shaving passageway 101 via an air flow induced by the rotation of the rotary cutter 46. A ventilated air flow coming from the ventilation outlet 411 enters into the air duct 60, and is guided via the channels 614 to flow into the shaving passageway 101 via the openings 74 of the shaving discharge plate 70 so as to generate a uniform distribution of air flow inside the shaving passageway 101 to blow the wood shavings toward the shaving outlet 90. Since the air flow is uniformly blown into the shaving passage 101, the height of the shaving outlet 90 can be reduced as small as possible without hindering the discharge of the wood shavings, thereby eliminating the aforementioned safety problem.

With the invention thus explained, it is apparent that various modifications and variations can be made without departing from the spirit of the present invention. It is therefore intended that the invention be limited only as recited in the appended claims.

I claim:

1. A wood planing machine comprising:

a base having a work table and a plurality of upstanding posts;

a carriage mounted movably on said posts above said work table and having a top surface and a front end;

a rotary cutter mounted on said carriage rearwardly of said front end;

a shaving discharge plate mounted on said carriage and extending rearwardly from said front end to a location above said rotary cutter to overlie said top surface and confine a shaving passageway between said shaving discharge plate and said top surface, said shaving discharge plate having a plurality of openings communicated with said shaving passageway and arranged in a row along the length of said shaving discharge plate adjacent to said front end;

driving means mounted on said carriage and connected to said rotary cutter, said driving means having a ventilation outlet adjacent to said shaving passageway; and a guide casing mounted on said shaving discharge plate above said openings to confine therewith an air duct between said shaving passageway and said ventilation outlet, said air duct having a tapered inlet communicated with said ventilation outlet, and a plurality of partitioned channels which extend divergingly inside said air duct from said tapered inlet to said openings of said shaving discharge plate and which are adapted to guide air from said ventilation outlet to flow past an entire space of said shaving passageway.

2. The wood planing machine of claim 1, wherein said guide casing further includes a plurality of partition plates so as to confine said channels.

3. The wood planing machine of claim 2, wherein said guide casing has a top wall which is disposed oppositely of and above said shaving discharge plate and which has a tapered end adjacent to said tapered inlet and an enlarged end adjacent to said openings of said shaving discharge plate, and a pair of side walls extending downward from said top wall to said shaving discharge plate, said partition plates extending downward from said top wall to said shaving discharge plate and having confronting faces which diverge away from one another, said top wall being inclined upward from said enlarged end to said tapered end, said side walls diverging from said tapered end to said enlarged end.

4. The wood planing machine of claim 3, wherein said shaving discharge plate includes a plurality of integral louver plates being formed respectively at said openings, said louver plates bent upward from said shaving discharge plate, said enlarged end of said top wall being clamped between said shaving discharge plate and said louver plates.

5. The wood planing machine of claim 1, further comprising a curved guide plate connected to said shaving discharge plate adjacent to said tapered inlet and extending from said shaving discharge plate downwardly and rearwardly, said curved guide plate extending circumferentially of said rotary cutter so as to confine with one side of said rotary cutter a curved passage that is communicated with said shaving passageway, said shaving passageway having a shaving outlet opposite to said curved passage.

6. The wood planing machine of claim 5, wherein said curved guide plate further includes a flange projecting rearwardly therefrom plate and secured to said carriage.

7. The wood planing machine of claim 1, further comprising a cover plate with an L-shaped cross-section, said cover plate having a downward extension covering said front end of said carriage and a top part extending above said shaving discharge plate and connected to said downward extension, said top part being secured to said carriage, said shaving discharge plate being fastened to said downward extension.

* * * * *